United States Patent
Yang et al.

(10) Patent No.: US 12,489,876 B2
(45) Date of Patent: Dec. 2, 2025

(54) VOLTAGE REGULATION FOR INCREASED ROBUSTNESS IN INDIRECT TIME-OF-FLIGHT SENSORS

(71) Applicant: OMNIVISION TECHNOLOGIES, INC., Santa Clara, CA (US)

(72) Inventors: Zheng Yang, San Jose, CA (US); Qi Niu, Sunnyvale, CA (US); Andreas Suess, San Jose, CA (US)

(73) Assignee: OMNIVISISION TECHNOLOGY, INC., Santa Clara, CA (US)

( * ) Notice: Subject to any disclaimer, the term of this patent is extended or adjusted under 35 U.S.C. 154(b) by 1071 days.

(21) Appl. No.: 17/513,069

(22) Filed: Oct. 28, 2021

(65) Prior Publication Data

US 2023/0147085 A1    May 11, 2023

(51) Int. Cl.
   *H04N 13/254* (2018.01)
   *G01S 17/894* (2020.01)
   *H03G 3/30* (2006.01)
   *H03K 5/24* (2006.01)
   (Continued)

(52) U.S. Cl.
   CPC ......... *H04N 13/254* (2018.05); *G01S 17/894* (2020.01); *H03G 3/30* (2013.01); *H03K 5/24* (2013.01); *H04N 13/271* (2018.05); *H04N 13/296* (2018.05)

(58) Field of Classification Search
   CPC .. H04N 13/254; H04N 13/296; H04N 13/271; G01S 17/894; G01S 7/4863; G01S 7/497; H03G 3/30; H03K 5/24; H10F 39/18
   See application file for complete search history.

(56) References Cited

U.S. PATENT DOCUMENTS

2019/0064862 A1*  2/2019  Pan ................. G05F 1/575
2022/0030187 A1*  1/2022  Meynants ........... H10F 39/8037
(Continued)

OTHER PUBLICATIONS

C.-L. Chen et al., "An Up-to-1400nm 500MHz Demodulated Time-of-Flight Image Sensor on a Ge-on-Si Platform," 2020 IEEE International Solid-State Circuits Conference, Feb. 17, 2020, pp. 97-99, IEEE.

(Continued)

*Primary Examiner* — Thanh Luu
*Assistant Examiner* — Mai Thi Ngoc Tran
(74) *Attorney, Agent, or Firm* — Dorsey & Whitney LLP

(57) ABSTRACT

A time-of-flight sensor includes an integrated circuit chip in which a voltage regulator and a load are disposed. The load includes a grouping of pixel circuits and modulation driver that is supplied power from the voltage regulator. The grouping of pixel circuits included in a pixel array disposed in the integrated circuit trip. Each one of the pixel circuits includes a photodiode configured to photogenerate charge in response to reflected modulated light, a floating diffusion configured to store a portion of charge photogenerated in the photodiode, and transfer transistor to transfer the portion of charge from the photodiode to the floating diffusion in response to a phase modulation signal generated by the modulation driver. A feedback circuit is coupled between the load and the voltage regulator and is coupled to receive a feedback signal from the feedback circuit in response to the load.

43 Claims, 4 Drawing Sheets

(51) Int. Cl.
*H04N 13/271* (2018.01)
*H04N 13/296* (2018.01)

(56) References Cited

U.S. PATENT DOCUMENTS

| | | | | |
|---|---|---|---|---|
| 2022/0244046 A1* | 8/2022 | Yokogawa | ............ | H04N 25/705 |
| 2023/0104685 A1* | 4/2023 | Leung | ........................ | G06F 1/28 |
| | | | | 713/320 |

OTHER PUBLICATIONS

C.-L. Chen et al., "An Up-to-1400nm 500MHz Demodulated Time-of-Flight Image Sensor on a Ge-on-Si Platform" [Presentation Slides], 2020 IEEE International Solid-State Circuits Conference, Feb. 17, 2020, pp. 1-17, EEE.

Andrew Payne et al., "7.6—A 512×424 CMOS 30 Time-of-Flight Image Sensor with Multi-Frequency Photo-Demodulation up to 130MHz and 2GS/s ADC," 2014 IEEE International Solid-State Circuits Conference, Feb. 10, 2014, pp. 133-135, IEEE.

A. Payne et al., "7.6—A 512×424 CMOS 30 Time-of-Flight Image Sensor with Multi-Frequency Photo-Demodulation up lo 130MHz and 2GS/s ADC" [Presentation Slides], 2014 IEEE International Solid-State Circuits Conference, Feb. 10, 2014, pp. 1-23, IEEE.

Cyrus S. Bamji et al., "1Mpixel 65nm BSI 320MHz Demodulated TOF Image Sensor with 3.51μm Global Shutter Pixels and Analog Binning," 2018 IEEE International Solid-State Circuits Conference, Feb. 12, 2018, pp. 93-95, IEEE.

Cyrus S. Bamji et al., "1Mpixel 65nm BSI 320MHz Demodulated TOF Image Sensor with 3.51μm Global Shutter Pixels and Analog Binning" [Presentation Slides], 2018 IEEE International Solid-State Circuits Conference, Feb. 12, 2018, pp. 1-26, IEEE.

Min-Sun Keel et al., "A 640×480 Indirect Time-of-Flight CMOS Image Sensor with 4-tap 7-μm Global-Shutter Pixel and Fixed-Pattern Phase Noise Self-Compensation Scheme," 2019 Symposium on VLSI Circuits Digest of Technical Papers, 2019, pp. C258-C259, JSAP.

* cited by examiner

VOLTAGE REGULATION FOR INCREASED ROBUSTNESS IN INDIRECT TIME-OF-FLIGHT SENSORS

BACKGROUND INFORMATION

Field of the Disclosure

This disclosure relates generally to image sensors, and in particular but not exclusively, relates to time-of-flight sensors.

Background

Interest in three dimensional (3D) cameras is increasing as the popularity of 3D applications continues to grow in areas such as imaging, movies, games, computers, user interfaces, facial recognition, object recognition, augmented reality, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the 3D images. In addition, this technique is complex and therefore requires significant computer processing power in order to create the 3D images in real time.

For applications that require the acquisition of 3D images in real time, active depth imaging systems based on time-of-flight measurements are sometimes utilized. Time-of-flight cameras typically employ a light source that directs light at an object, a sensor that detects the light that is reflected from the object, and a processing unit that calculates the distance to the object based on the round-trip time it takes for the light to travel to and from the object.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
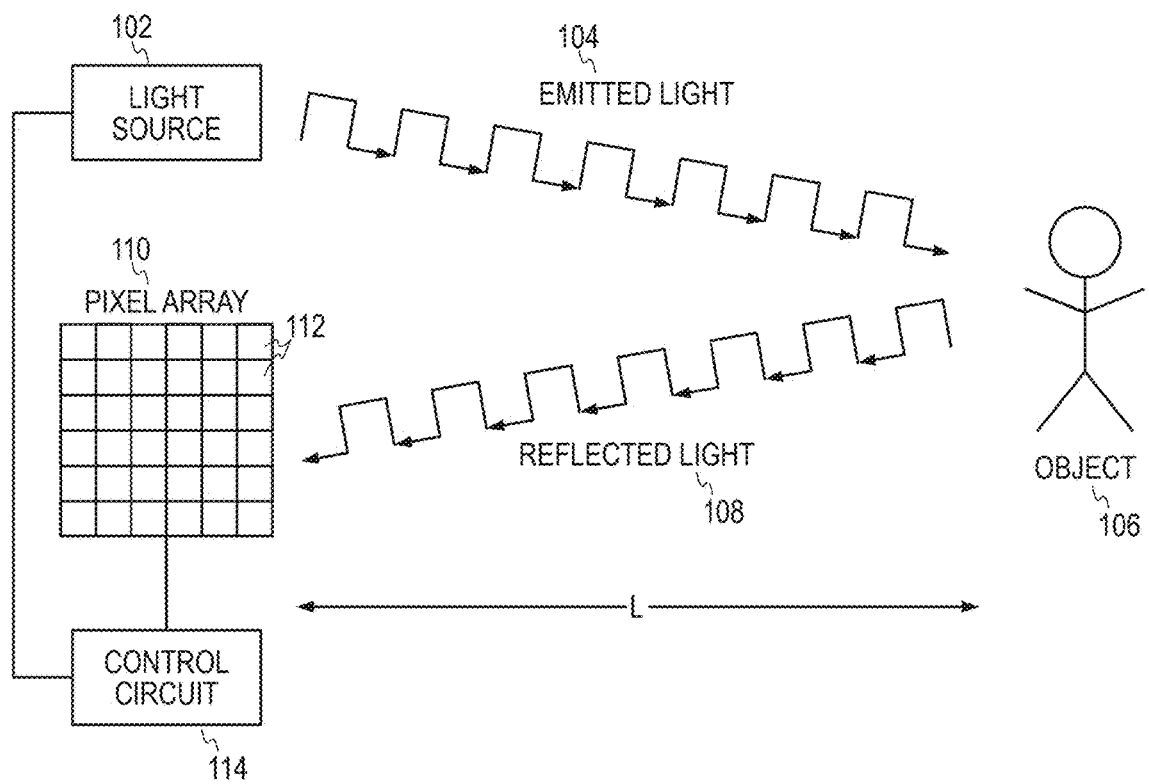
FIG. 1 is a block diagram that shows one example of a time-of-flight light sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to various embodiments of indirect time-of-flight sensors with integrated on-chip voltage regulation for modulation drivers are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of indirect time-of-flight sensors with integrated on-chip voltage regulation for modulation drivers are shown. In the various examples, the voltage regulators that supply power the modulation drivers and their respective loads are integrated onto the same integrated circuit chip or wafer in accordance with the teachings of the present invention.

In operation, modulated light that is reflected from an object impinges onto the pixel circuits of the indirect time-of-flight sensors. The object distance is determined in response to the measured phase of the modulation, which may be used to yield a 3D frame. As will be described in the various examples, a demodulation pixel front-end down-converts and/or mixes this waveform with a differential phase modulation signals that are applied to the transfer gates or transfer transistors of the indirect time-of-flight pixel circuits. The differential phase modulation signals have the same frequency as the modulated light to realize homodyne detection by the indirect time-of-flight sensor. Employing different phases in the differential phase modulation signals allows to reconstruction of the encoded distance. In various examples, at least 3 independent measurements (e.g., sub-frames) are employed to decode the 3 unknowns of distance/phase, reflectivity, and ambient light. Typically 4 phases are used (e.g., 0°/180° and 90°/270°).

It is noted that phases that are increments of 360° apart cannot be distinguished, which consequently results in ambiguities in the measurements. As a result, the modulation frequency of the differential phase modulation signal is chosen not to exceed a maximum modulation frequency in order to accommodate a desired depth range. However, a tradeoff is that increasing the modulation frequency improves precision. Hence, multiple frequencies are typically incorporated to resolve ambiguities and still yield acceptable precision. At each frequency, all 3/4 phases need to be acquired.

The differential phase modulation signals generated by the modulation drivers utilized in indirect time-of-flight sensors typically have a very high modulation frequency (e.g., hundreds of MHz). In addition, the loads that are driven by the modulation drivers utilized in indirect time-of-flight sensors have load capacitances that are ever increasing due to the demand for higher resolution peak currents. For instance, higher resolution peak currents in the order of greater than 1 Amp are not uncommon. Accommodating the fast transients in higher resolution peak currents present a continuing challenge for the voltage regulators, such as for example external low dropout regulators (LDOs), that supply power to the modulation drivers utilized in indirect time-of-flight sensors. These fast transients can cause undesired voltage droops across loads such as pixel arrays that are driven by the modulation drivers utilized in indirect time-of-flight sensors that are observed until equilibrium states are found. These equilibrium conditions depend on the average current consumption, which varies with modulation frequencies or temperature. Furthermore, even if an equilibrium condition is found, waveforms closer to the outputs of modulation drivers utilized in indirect time-of-flight sensors can exhibit a larger modulation voltage swing than waveforms that are further downstream from the outputs of the outputs of modulation drivers utilized in indirect time-of-flight sensors.

Therefore, various examples of indirect time-of-flight sensors in accordance with the teachings of the present invention include voltage regulators, such as for example LDOs, that are integrated directly into the same integrated circuit chip or wafer as the modulation drivers and pixel circuits of the pixel array of the indirect time-of-flight sensors. Integrating the voltage regulators directly into the same integrated circuit chip or wafer of the indirect time-of-flight sensor has the advantage that the feedback to the error amplifier of the voltage regulator can be chosen more flexibly. For instance, if the error amplifier of the voltage regulator is connected directly to the local modulation driver on the same integrated circuit chip, the frequency/temperature dependent voltage drop between voltage regulator and local modulation driver is compensated since they are both integrated onto the same integrated circuit chip.

Another benefit of integrating the voltage regulator onto the same integrated circuit chip or wafer as the local modulation driver and pixel circuits of the pixel array of the indirect time-of-flight sensor is that a distributed architecture can be implemented in accordance with the teachings of the present invention. As such, groupings of pixel circuits (e.g., rows or columns of pixel circuits of the pixel array) that are driven by the local modulation drivers can each have their own local feedback. This is beneficial to avoid voltage drop differences between different groupings of pixel circuits (e.g., different rows or different columns of pixel circuits) in the pixel array of the indirect time-of-flight sensor due to the fact that it is often challenging to yield matching supply routing between neighboring rows or neighboring columns due to different pitches between rows or columns compared to the pitch of the bond pads.

To illustrate, FIG. 1 is a block diagram that shows one example of a time-of-flight light sensing system 100 in accordance with the teachings of the present invention. As shown in the depicted example, time-of-flight light sensing system 100 includes light source 102, a pixel array 110, which includes a plurality of pixel circuits 112, and a control circuit 114 that is coupled to the pixel array 110 and light source 102.

As shown in the example, light source 102 and pixel array 110 are positioned at a distance L from object 106. Light source 102 is configured to emit light 104 towards object 106. Reflected light 108 is directed back from object 106 to pixel array 110 as shown. It is noted that pixel array 110 and control circuit 114 are represented as separate components in FIG. 1 for explanation purposes. However, it is appreciated that pixel array 110 and components of control circuit 114 may be integrated onto a same integrated circuit chip or wafer in a non-stacked standard planar sensor in accordance with the teachings of the present invention.

In the depicted example, time-of-flight light sensing system 100 includes a 3D camera that calculates image depth information of a scene (e.g., object 106) based on indirect time-of-flight (e.g., iToF) measurements with an image sensor that includes pixel array 110. In some examples, it is appreciated that although time-of-flight light sensing system 100 is capable of sensing 3D images, time-of-flight light system 100 may also be utilized to capture 2D images. In various examples, time-of-flight light sensing system 100 may also be utilized to capture high dynamic range (HDR) images.

Continuing with the depicted example, each pixel circuit 112 of pixel array 110 determines depth information for a corresponding portion of object 106 such that a 3D image of object 106 can be generated. In the depicted example, depth information is determined by driving the transfer gates of each pixel circuit 112 with differential phase modulation signals to measure the delay/phase difference between emitted light 104 and the received reflected light 108 to indirectly determine a round-trip time for light to propagate from light source 102 to object 106 and back to the pixel array 110 of time-of-flight light sensing system 100. The depth information may be based on an electric signal generated by the photodiode included in each pixel circuit 112, which is subsequently transferred to a storage node and read out.

As illustrated, light source 102 (e.g., a light emitting diode, a vertical cavity surface emitting laser, or the like) is configured to emit modulated light 104 (e.g., emitted light waves/pulses) to the object 106 over a distance L. The emitted light 104 is then reflected from the object 106 as reflected modulated light 108 (e.g., reflected light waves/pulses), some of which propagates towards the pixel array 110 of time-of-flight light sensing system 100 over the distance L and is incident upon the pixel circuits 112 of pixel array 110 as image light. Each pixel circuit 112 included in the pixel array 110 includes a photodetector (e.g., one or more photodiodes, avalanche photodiodes, or single-photon avalanche diodes, or the like) to detect the reflected light 108 and convert the reflected light 108 into an electric signal (e.g., electrons, image charge, etc.).

As shown in the depicted example, the round-trip time for emitted light 104 to propagate from light source 102 to object 106 and then be reflected back to pixel array 110 can be used to determine the distance L using the following relationships in Equations (1) and (2) below:

$$T_{TOF} = \frac{2L}{c} \quad (1)$$

$$L = \frac{T_{TOF} \cdot c}{2} \quad (2)$$

where c is the speed of light, which is approximately equal to $3 \times 10^8$ m/s, and $T_{TOF}$ corresponds to the round-trip time, which is the amount of time that it takes for the light to travel to and from the object 106 as shown in FIG. 1. Accordingly, once the round-trip time is known, the distance L may be calculated and subsequently used to determine depth information of object 106.

As shown in the depicted example, control circuit 114 is coupled to pixel array 110 and light source 102, and includes logic and memory that when executed causes time-of-flight light sensing system 100 to perform operations for determining the round-trip time. Determining the round-trip time may be based on, at least in part, timing signals generated by control circuit 114. For indirect time-of-flight measurements, the timing signals are representative of the delay/phase difference between the light waves/pulses of when the light source 102 emits light 104 and when the photodetectors in pixel circuits 112 detect the reflected light 108.

In some examples, time-of-flight light sensing system 100 may be included in a device (e.g., a mobile phone, a tablet, a camera, etc.) that has size and power constraints determined, at least in part, based on the size of the device. Alternatively, or in addition, time-of-flight light sensing system 100 may have specific desired device parameters such as frame rate, depth resolution, lateral resolution, etc.

Figure 2:
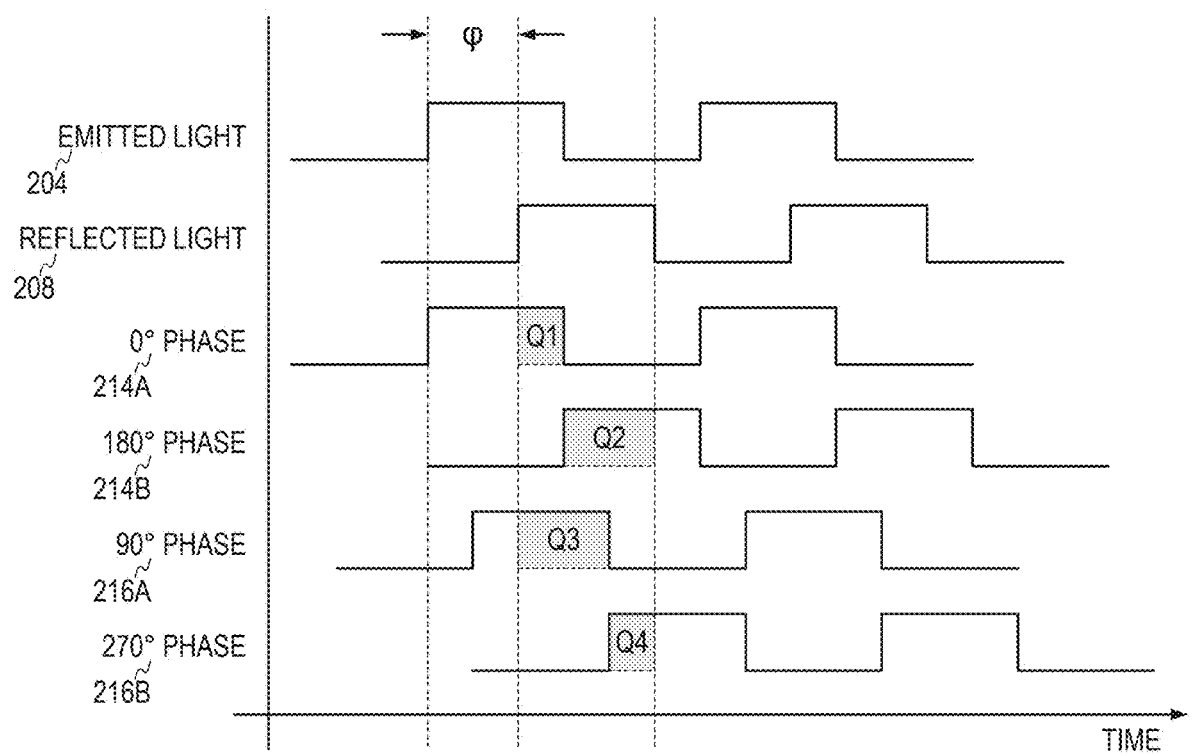
FIG. 2 is a timing diagram that shows an example of light pulses emitted from a light source relative to the receipt of the reflected light pulses and measurements using various phase shifts in an example time-of-flight imaging system accordance with the teachings of the present invention.

FIG. 2 is a timing diagram that illustrates the timing relationship between example light pulses emitted from a light source relative to the receipt of the reflected light pulses and measurements using various phase shifts in an example time-of-flight imaging system accordance with the teachings of the present invention. Specifically, FIG. 2 shows emitted light 204, which represents the modulated light pulses that are emitted from light source 102 to object 106, and corresponding pulses reflected light 208, which represents the reflected light pulses that are back-reflected from object 106 and received by pixel array 110 of FIG. 1.

The example depicted in FIG. 2 also illustrates measurement pulses of the differential phase modulation signals including a 0° phase modulation signal 214A and a 180° phase modulation signal 214B, as well as measurement pulses including a 90° phase modulation signal 216A and a 270° phase modulation signal 216B, which as shown are all phase-shifted relative to the phase of the pulses of emitted light 204. In addition, FIG. 2 shows that the 0° phase modulation signal 214A and 180° phase modulation signal 214B, as well as the 90° phase modulation signal 216A and 270° phase modulation signal 216B pulses are all modulated at the same frequency as the modulated emitted light 204 and reflected light 208 to realize homodyne detection of the reflected light 208 in accordance with the teachings of the present invention. Utilizing the different phases for the example measurement pulses as shown allows reconstruction of the encoded distance. In the various examples, at least 3 independent measurements (e.g., sub-frames) are utilized to decode 3 unknowns: distance/phase, reflectivity, and ambient. In examples described herein, 4 phases are utilized (e.g., 0°, 180°, 90°, and 270°).

As will be discussed, the 0° phase modulation signal 214A and 180° phase modulation signal 214B, as well as the 90° phase modulation signal 216A and 270° phase modulation signal 216B pulses correspond to the switching of transfer transistors or transfer gates that are included in the pixel circuits 112 of pixel array 110. In operation, the switching of the transfer transistors in the pixel circuits 112 of pixel array 110 can be used to measure the charge that is photogenerated in the one or more photodiodes that are included the pixel circuits 112 in response to the reflected light 208 to determine the delay or phase difference φ between the pulses of emitted light 204 and the corresponding pulses of reflected light 208.

For instance, the example illustrated in FIG. 2 shows that charge Q1 is photogenerated by the pulses of 0° phase modulation signal 214A and that charge Q2 is photogenerated by the pulses of 180° phase modulation signal 214B in response to reflected light 208. Similarly, charge Q3 is photogenerated by the pulses of 90° phase 216A and charge Q4 is photogenerated by the pulses of 270° phase modulation signal 216B in response to reflected light 208. In various examples, the measurements of Q1, Q2, Q3, and Q4 can then be used to determine the delay or phase difference φ between the emitted light 204 and the reflected light 208, and therefore the time-of-flight $T_{TOF}$ of light from the light source 102 to the object 106 and then back to the pixel array 110 in accordance with the teachings of the present invention.

Figure 3:
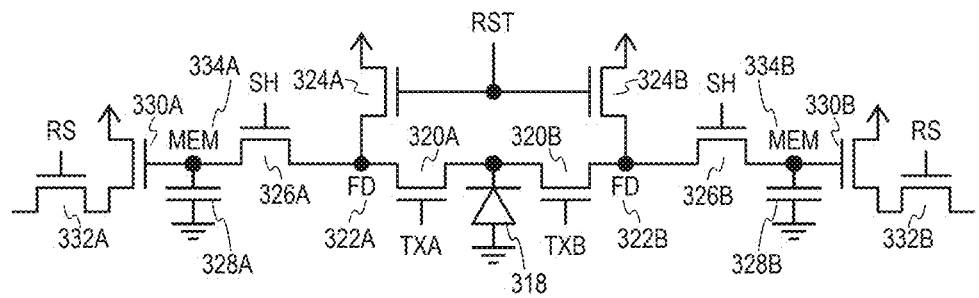
FIG. 3 is a schematic illustrating an example of a time-of-flight pixel in accordance with the teachings of the present invention.

FIG. 3 a schematic illustrating an example of a time-of-flight pixel circuit 312 in accordance with the teachings of the present invention. It is appreciated the pixel circuit 312 of FIG. 3 may be an example of one of the pixel circuits 112 included in pixel array 110 shown in FIG. 1, and that similarly named and numbered elements described above are coupled and function similarly below.

As shown in the example depicted in FIG. 3, pixel circuit 312 includes a photodiode 318 configured to photogenerate charge in response to incident light. In one example, the light that is incident on photodiode 318 is the reflected modulated light 108 that is reflected from an object 106 as described in FIG. 1. A first floating diffusion FD 322A is configured to store a first portion of charge photogenerated in the photodiode 318, such as for example charge Q1 or Q3 described in FIG. 2. A second floating diffusion FD 322B is configured to store a second portion of charge photogenerated in the photodiode 318, such as for example charge Q2 or Q4 described in FIG. 2.

A first transfer transistor 320A is configured to transfer the first portion of charge from the photodiode 318 to the first floating diffusion FD 322A in response to a first phase modulation signal TXA. In one example, the first phase modulation signal TXA may be an example of one of the phase modulation signals described in FIG. 2, such as for example 0° phase modulation signal 214A or 90° phase modulation signal 214C. A second transfer transistor 320B is configured to transfer the second portion of charge from the photodiode 318 to the second floating diffusion FD 322B in response to a second phase modulation signal TXB. In one example, the second phase modulation signal TXB may be an example of another one of the phase modulation signals described in FIG. 2, such as for example 180° phase modulation signal 214B or 270° phase modulation signal 214D. In the various examples, the first phase modulation signal TXA and the second phase modulation signal TXB are out of phase with each other, such as for example 180° out of phase with each other. In the example, a first storage node MEM 334A is configured to store the first portion of charge from the first floating diffusion FD 322A through a first sample and hold transistor 326A, and a second storage node MEM 334B is configured to store the second portion of charge from the second floating diffusion FD 322B through a second sample and hold transistor 326B.

Continuing with the example depicted in FIG. 3, the first storage node MEM 334A is coupled to a first capacitor 328A and a gate of a first source follower transistor 330A. A first row select transistor 332A is coupled to a source of the first source follower transistor 330A. In the various examples, the first row select transistor 332A is also coupled to a bit line, through which first output signal information may be read out from pixel circuit 312. Similarly, the second storage node MEM 334B is coupled to a second capacitor 328B and a gate of a second source follower transistor 330B. A second row select transistor 332B is coupled to a source of the second source follower transistor 330B. In the various examples, the second row select transistor 332B is also coupled to a bit line, through which second output signal information may be read out from pixel circuit 312.

In the various examples, pixel circuit 312 also includes a first reset transistor 324A coupled between a supply rail and the first floating diffusion FD 322A. In various examples, first reset transistor 324A is configured to reset the first floating diffusion FD 322A as well the first storage node MEM 334A in response to a reset signal RST. In the example depicted in FIG. 3, the first reset transistor 324A is configured to reset the first storage node MEM 334A through the first sample and hold transistor 326A.

Similarly, pixel circuit 312 also includes a second reset transistor 324B coupled between the supply rail and the second floating diffusion FD 322B. In various examples, second reset transistor 324B is configured to reset the second floating diffusion FD 322B as well the second storage node MEM 334B in response to the reset signal RST. In the example depicted in FIG. 3, the second reset transistor 324B is configured to reset the second storage node MEM 334B through the second sample and hold transistor 326B.

Figure 4:
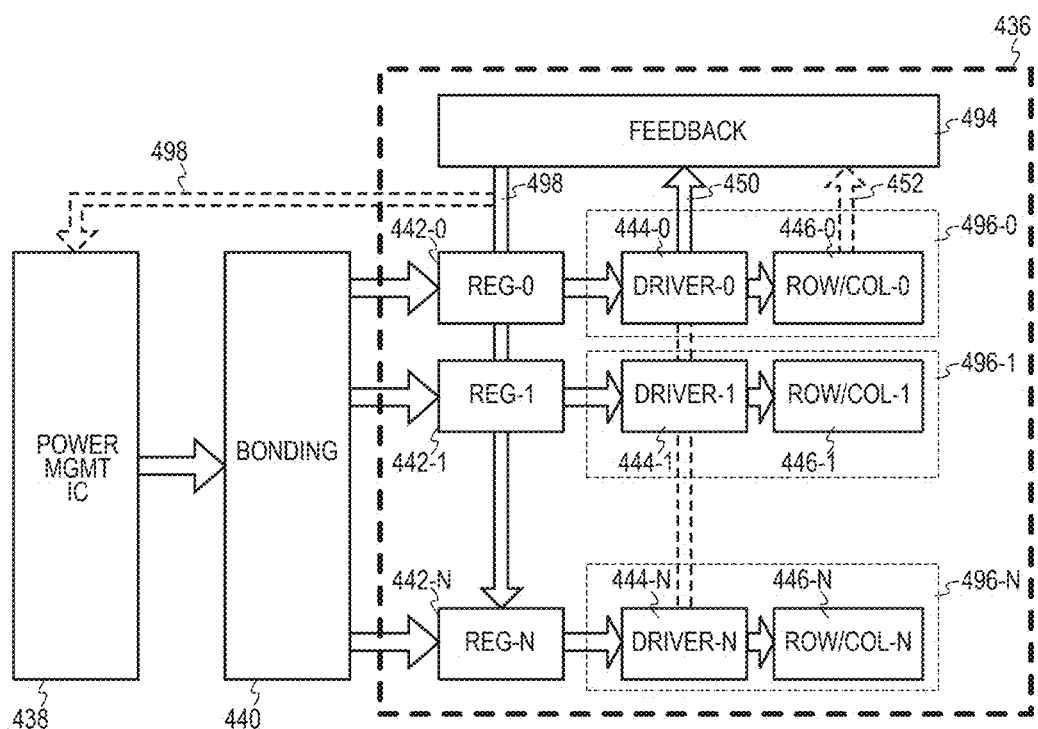
FIG. 4 is a block diagram illustrating one example of a time-of-flight sensor with voltage regulators, modulation drivers, and a time-of-flight pixel array that are all integrated onto the same integrated circuit chip to provide on-chip voltage regulation in accordance with the teachings of the present invention.

FIG. 4 is a block diagram illustrating one example of a time-of-flight sensor 400 with voltage regulators, modulation drivers, and a time-of-flight pixel array that are all integrated onto the same integrated circuit chip to provide on-chip voltage regulation in accordance with the teachings of the present invention. It is appreciated the time-of-flight sensor 400 of FIG. 4 may be an example of the time-of-flight sensor including pixel array 110 and control circuit 114 of the time-of-flight sensing system 100 shown in FIG. 1, and that similarly named and numbered elements described above are coupled and function similarly below.

As shown in the example depicted in FIG. 4, time-of-flight sensor 400 includes an integrated circuit chip 436, which is coupled to be supplied power from a power management integrated circuit 438 through bonding pads 440. In one example, the power that is supplied from the power management integrated circuit 438 includes a first supply voltage and a second supply voltage that is provided to a plurality of voltage regulators 442-0 to 442-N included in the integrated circuit chip 436. In the depicted example, the plurality of voltage regulators 442-0 to 442-N, a plurality of loads 496-0 to 496-N, and a feedback circuit 494 are all disposed in the same wafer or integrated circuit chip 436. Each one of the plurality of loads 496-0 to 496-N is coupled to be supplied power from a respective one of the plurality of voltage regulators 442-0 to 442-N. In one example, each on of the plurality of voltage regulators 442-0 to 442-N includes a low dropout regulator. In one example, the power management integrated circuit 438 is an off-chip power management integrated circuit that may optionally be coupled to receive a feedback signal 498 from the feedback circuit 494 of integrated circuit chip 436. In one example, the feedback signal 498 may be utilized by the power management integrated circuit 438 to indicate the required power consumption (e.g., current, voltage, etc.) of the plurality of voltage regulators 442-0 to 442-N in integrated circuit chip 436 in order to optimize the required voltage drop and hence excess power consumption of the voltage regulators as function of the current consumption of the plurality of voltage regulators 442-0 to 442-N as well as compensate for process, voltage, and temperature variations that may occur among the plurality of voltage regulators 442-0 to 442-N during chip manufacture.

Each one of the plurality loads 496-0 to 496-N includes a modulation driver 444-0 to 444-N that is coupled to be supplied power from the respective one of the plurality of voltage regulators 442-0 to 442-N. Each one of the plurality of loads 496-0 to 496-N also includes a grouping of pixel circuits 446-0 to 446-N, which in the various examples include one or more transistors that are driven by the respective modulation driver. In the example, each one of the grouping of pixel circuits is one of a plurality of groupings of pixel circuits 446-0 to 446-N included in a time-of-flight pixel array, such as for example pixel array 110, disposed in the integrated circuit chip 436. For instance, in one example, the groupings of pixel circuits 446-0 to 446-N may represent row 0 to row N of the pixel array 110. In another example, the groupings of pixel circuits 446-0 to 446-N may represent column 0 to column N of the pixel array 110. In the various examples, each of the pixel circuits included in the groupings of pixel circuits 446-0 to 446-N may be examples of pixel circuit 312 discussed above in FIG. 3 or examples of pixel circuits 112 of pixel array 110 discussed above in FIG. 1.

Continuing with the depicted example, the feedback circuit 494 is also disposed in the integrated circuit chip 436. In one example, the feedback circuit 494 is coupled between said each one of the plurality of loads 496-0 to 496-N and the respective one of the plurality of voltage regulators 442-0 to 442-N. In the example where feedback circuit 494 is coupled to each one of the plurality of loads 496-0 to 496-N, feedback circuit 494 is coupled to receive a driver feedback input signal 450 from each one of the plurality of loads 496-0 to 496-N. As such, the modulation driver 444-0 to 444-N is coupled to receive the feedback signal 498 from the feedback circuit 494 in response to the respective local one of the plurality of loads 496-0 to 496-N.

In another example, feedback circuit 494 the coupled to receive the driver feedback input signal 450 and a grouping of pixel circuits feedback input signal 452 from one of the plurality of loads 496-0. In one example, the one of the plurality of loads 496-0 may be considered to be a reference one of the plurality of loads 496-0 to 496-N that is used to generate the feedback signal 498 that is coupled to be received by the plurality of modulation drivers 444-0 to 444-N. In one example, the reference one of the plurality of loads 496-0 may be a dummy load that is used to generate the feedback signal 498 that is coupled to be received by the plurality of modulation drivers 444-0 to 444-N. As such, each one of the plurality of modulation drivers 444-0 to 444-N is coupled to receive the feedback signal 498 from the feedback circuit 494 in response to the reference one of the plurality of loads 496-0 to 496-N, which in one example may be a dummy load that is configured to be representative of any one of the plurality of loads 496-0 to 496-N.

As will be shown, it is appreciated that the example plurality of voltage regulators 442-0 to 442-N integrated directly onto the same integrated circuit chip 436 as the plurality of modulation drivers 444-0 to 444-N and the plurality of groupings of pixel circuits 446-0 to 446-N has the advantage that the feedback signal 498 to the error amplifier included in the low dropout regulators of voltage regulators 442-0 to 442-N can be chosen more flexibly. For instance, in an example in which the error amplifier included in the low dropout regulators of voltage regulators 442-0 to 442-N is connected directly to the local modulation driver 444-0 to 444-N, the frequency and/or temperature dependent voltage drop between an external supply and local modulation driver 444-0 to 444-N is compensated.

Another advantage of integrating the low dropout regulators of voltage regulators 442-0 to 442-N on the same integrated circuit chip 436 as the plurality of modulation drivers 444-0 to 444-N and the plurality of groupings of pixel circuits 446-0 to 446-N is that a distributed architecture can be implemented so that each grouping of pixel circuits 446-0 to 446-N (e.g., each row or each column of the pixel array) can have its own local feedback signal 498 in various examples. This is beneficial to avoid for example voltage drop differences between rows or columns of the pixel array due to the fact that it is not easy to yield matching supply routing between neighboring rows columns due to different pitches between the rows or columns compared to the bond pad pitch.

Figure 5A:
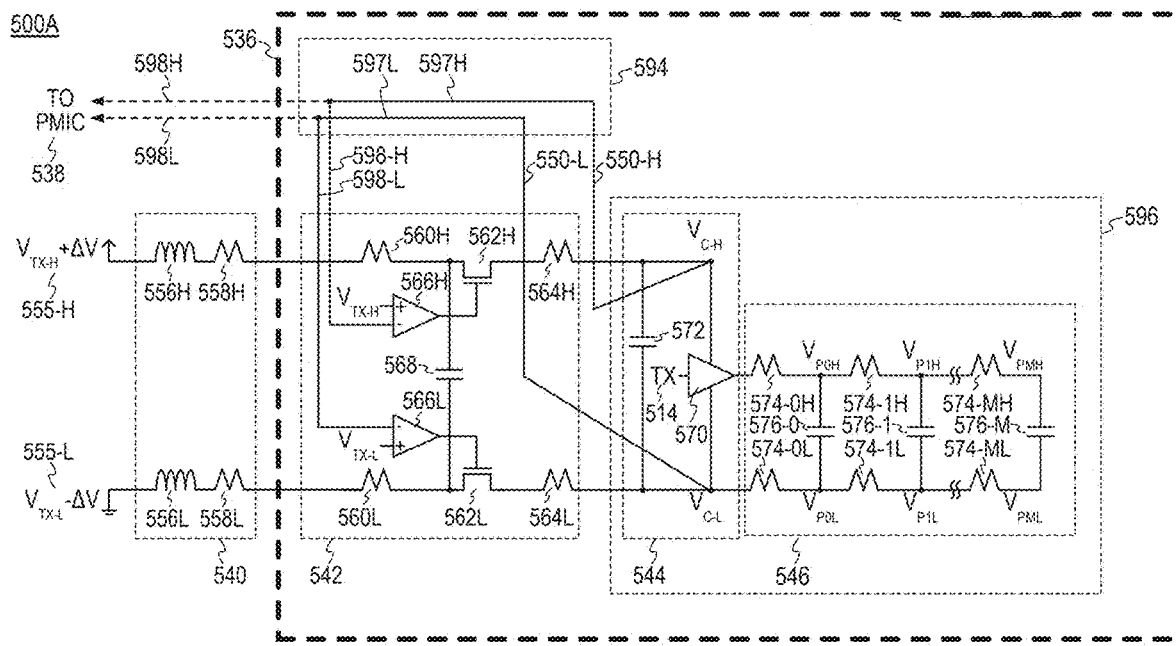
FIG. 5A is a schematic illustrating one example of a time-of-flight sensor with voltage regulators, modulation drivers, and a time-of-flight pixel array that are all integrated onto the same integrated circuit chip to provide on-chip voltage regulation in accordance with the teachings of the present invention.

FIG. 5A is a schematic illustrating one example of a time-of-flight sensor 500A with voltage regulators, modulation drivers, and a time-of-flight pixel array that are all integrated onto the same integrated circuit chip to provide on-chip voltage regulation in accordance with the teachings of the present invention. It is appreciated the time-of-flight sensor 500A of FIG. 5A may be an example of the time-of-flight sensor 400 of FIG. 4, or an example of the time-of-flight sensor including pixel array 110 and control circuit 114 of the time-of-flight sensing system 100 shown in FIG. 1, and that similarly named and numbered elements described above are coupled and function similarly below. It is also appreciated that the time-of-flight sensor 500A of FIG. 5A shares many similarities with the example time-of-flight sensor 400 illustrated in FIG. 4.

For instance, as shown in the example depicted in FIG. 5A, time-of-flight sensor 500A includes an integrated circuit chip 536, which is coupled to receive a first supply voltage 555-H and a second supply voltage 555-L. In the example, the integrated circuit chip 536 is coupled to receive the first supply voltage 555-H through an inductance 556H and a resistance 558H, which are representative of bonding pads 540. In one example, the first supply voltage 555-H received by inductance 556H and resistance 558H and is approximately equal to $V_{TX-H}+\Delta V$. In addition, the integrated circuit chip 536 is coupled to receive the second supply voltage 555-L through an inductance 556L and a resistance 558L, which are also representative of bonding pads 540. In one example, the second supply voltage 555-L received by inductance 556L and resistance 558L is approximately equal to $V_{TX-H}-\Delta V$.

FIG. 5A shows that voltage regulator 542 is coupled to receive the first supply voltage 555-H and the second supply voltage 555-L. In the example, the voltage regulator 542 is coupled to supply regulated power to a load 596. In the various examples, the voltage regulator 542 is one of a plurality of voltage regulators and load 596 is one of a plurality of loads that are included on the same wafer or integrated circuit chip 536. In operation, a feedback circuit 594 disposed on the integrated circuit chip 536 is coupled between the load 596 and the voltage regulator 542 to provide a feedback signal to voltage regulator 542 that is representative or responsive to load conditions of load 596. In the example, the feedback signal provided by feedback circuit 594 includes a high side feedback signal 598-H and a low side feedback signal 598-L that are coupled to be received by the voltage regulator 542. In one example, the high side feedback signal 598-H and the low side feedback signal 598-L may also optionally be coupled to be received by the power management integrated circuit (PMIC) 538. In the example, the power management integrated circuit (PMIC) 538 may be configured to provide the first supply voltage 555-H and the second supply voltage 555-L in response to the high side feedback signal 598-H and the low side feedback signal 598-L.

As shown in the depicted example, load 596 includes a modulation driver 544 that is coupled to be supplied power from the voltage regulator 542. Load 596 also includes a grouping of pixel circuits 546. In the example, the grouping of pixel circuits 546 is one of a plurality of groupings of pixel circuits included in a time-of-flight pixel array, such as for example pixel array 110, disposed in the integrated circuit chip 536. For instance, in one example, the groupings of pixel circuits 546 may represent one of the rows the pixel array 110. In another example, the groupings of pixel circuits 546 may represent one of the columns of the pixel array 110. In the various examples, each of the pixel circuits included in the groupings of pixel circuits 546 may be examples of pixel circuit 312 discussed above in FIG. 3 or examples of pixel circuits 112 of pixel array 110 discussed above in FIG. 1.

In operation, the modulation driver 544 includes a driver 570 that is configured to be suppled power from a first voltage input $V_{C-H}$ and a second voltage input $V_{C-L}$ of the modulation driver 544. In the example, the first voltage input $V_{C-H}$ is a high side voltage input of driver 570 and second voltage input $V_{C-L}$ is a low side voltage input of driver 570. In the depicted example, a capacitance between the high side voltage input $V_{C-H}$ and the low side voltage input $V_{C-L}$ of driver 570 is represented in FIG. 5A with a capacitance 572 as shown. Driver 570 is configured to receive a phase modulation signal TX 514. In the various examples, the phase modulation signal TX 514 may be an example of the 0° phase modulation signal 214, or the 180° phase modulation signal 214B, or the 90° phase modulation signal 216A, or the 2700 phase modulation signal 216B described in FIG. 2. As such, the driver 570 is configured to drive the transfer gates that are included in the grouping of pixel circuits 546. In one example, the grouping of pixel circuits 546 through with the phase modulation signal TX 514 is driven may be represented with a network of high side resistances 574-OH, 574-1H, . . . , 574-NM, low side resistances 574-0L, 574-1L, . . . , 574-ML, and capacitances 576-0, 576-1, . . . , 576-M as shown. As shown, the high side resistances 574-OH, 574-1H, . . . , 574-MH are coupled to the output of driver 570 and the low side resistances 574-0L, 574-1L, . . . , 574-ML are coupled to the low side voltage input $V_{C-L}$ of driver 570. In the example, it is appreciated that the voltage swings between the nodes $V_{POH}/V_{POL}$, $V_{PIH}/V_{PIL}$, . . . , $V_{PMH}/V_{PML}$ across respective capacitances 576-0, 576-1, . . . , 576-M may be representative of the voltage swings of the phase modulation signal TX 514 as they appear at the respective transfer gates or transfer transistors of the pixel circuits that are included in the grouping of pixel circuits 546 of the pixel array.

In various examples, the voltage regulator 542 includes or is implemented with low dropout regulators as shown in FIG. 5A. For instance, voltage regulator 542 includes a first transistor 562H that is coupled between the first supply voltage 555-H through a resistance 560H and the first voltage input $V_{C-H}$ of driver 570 through a resistance 564H. Voltage regulator 542 also includes a first comparator 566H having a first input (e.g., "+"), a second input (e.g., "−"), and an output that is coupled to the gate of the first transistor 562H as shown. The first input of the first comparator 566H is coupled to a first reference voltage $V_{TX-H}$, and the second input of the first comparator 566H is coupled to receive the feedback signal from the feedback circuit 594. In the example depicted in FIG. 5A, the second input of the first comparator 566H is coupled to receive the high side feedback signal 598-H portion of the feedback signal from the feedback circuit 594. In one example, the first reference voltage $V_{TX-H}$ may be provided with a first bandgap reference circuit.

In the depicted example, voltage regulator 542 also optionally includes a second transistor 562L that is coupled between the second supply voltage 555-L through a resistance 560L and the second voltage input $V_{C-L}$ of driver 570 through a resistance 564L. In this example, voltage regulator 542 also includes a second comparator 566L having a first input (e.g., "+"), a second input (e.g., "−"), and an output that is coupled to the gate of the second transistor 562L as shown. The first input of the second comparator 566L is coupled to a second reference voltage $V_{TX-L}$, and the second input of the second comparator 566L is coupled to receive the feedback signal from the feedback circuit 594. In the example depicted in FIG. 5A, the second input of the first comparator 566L is coupled to receive the low side feedback signal 598-L portion of the feedback signal from the feedback circuit 594. In one example, the second reference voltage $V_{TX-L}$ may be provided with a second bandgap reference circuit. In the depicted example, a capacitance between the input side first transistor 562H and the input side of second transistor 562L is represented in FIG. 5A with a capacitance 568 as shown.

Continuing with the example depicted in FIG. 5A, feedback circuit 594 is coupled to receive a driver feedback input signal, which includes a first driver feedback input signal 550-H from the first voltage input $V_{C-H}$ of the modulation driver 544 of load 596, and a second driver feedback input signal 550-L from the second voltage input $V_{C-L}$ of the modulation driver 544 of load 596 as shown. In the example depicted in FIG. 5A, feedback circuit includes a high side coupling 597H coupled between the first voltage input $V_{C-H}$ of the modulation driver 544 and the second input of the first comparator 566H as shown. In addition, feedback circuit also includes a low side coupling 597L coupled between the second voltage input $V_{C-L}$ of the modulation driver 544 and the second input of the second comparator 566L. In one example, there may be a respective high side coupling 597H and a respective low side coupling 597L coupled between the voltage regulator 542 and the modulation driver 544 of each one of the plurality of loads 596 to provide local feedback to each voltage regulator.

In operation, the first comparator 566H is configured to monitor the first voltage input $V_{C-H}$ of driver 570 via the high side feedback signal 598-H received from the feedback circuit 594 and compare it to the first reference voltage $V_{TX-H}$ to control the drive of the first transistor 562H to regulate the voltage at the first voltage input $V_{C-H}$ of driver 570. Similarly, the second comparator 566L is configured to monitor the second voltage input $V_{C-L}$ of driver 570 via the low side feedback signal 598-L received from the feedback circuit 594 and compare it to the second reference voltage $V_{TX-L}$ to control the drive of the second transistor 562L to regulate the voltage at the second voltage input $V_{C-L}$ of driver 570.

Figure 5B:
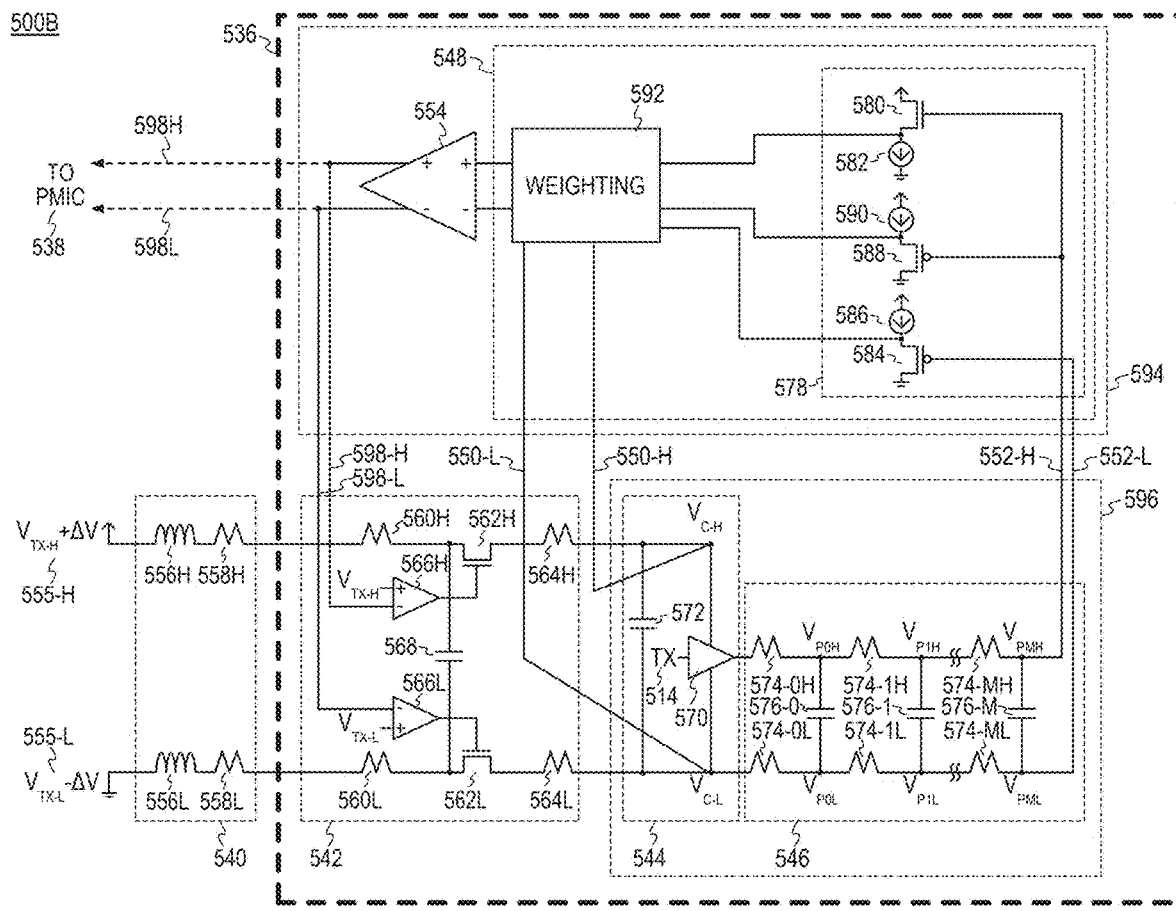
FIG. 5B is a schematic illustrating another example of a time-of-flight sensor with voltage regulators, modulation drivers, and a time-of-flight pixel array that are all integrated onto the same integrated circuit chip to provide on-chip voltage regulation in accordance with the teachings of the present invention.

FIG. 5B is a schematic illustrating another example of a time-of-flight sensor 500B with voltage regulators, modulation drivers, and a time-of-flight pixel array that are all integrated onto the same integrated circuit chip to provide on-chip voltage regulation in accordance with the teachings of the present invention. It is appreciated the time-of-flight sensor 500B of FIG. 5B may be another example of the time-of-flight sensor 500A of FIG. 5A, or an example of the time-of-flight sensor 400 of FIG. 4, or an example of the time-of-flight sensor including pixel array 110 and control circuit 114 of the time-of-flight sensing system 100 shown in FIG. 1, and that similarly named and numbered elements described above are coupled and function similarly below. It is also appreciated that the time-of-flight sensor 500B of FIG. 5B shares many similarities with the example time-of-flight sensor 500A illustrated in FIG. 5A.

For instance, as shown in the example depicted in FIG. 5B, time-of-flight sensor 500B includes an integrated circuit chip 536, which is coupled to receive a first supply voltage 555-H and a second supply voltage 555-L. In the example, the integrated circuit chip 536 is coupled to receive the first supply voltage 555-H through an inductance 556H and a resistance 558H, which are representative of bonding pads 540. In addition, the integrated circuit chip 536 is coupled to receive the second supply voltage 555-L through an inductance 556L and a resistance 558L, which are also representative of bonding pads 540. In one example, the first supply voltage 555-H received by inductance 556H and resistance 558H and is approximately equal to $V_{TX-H}+\Delta V$, and the second supply voltage 555-L received by inductance 556L and resistance 558L is approximately equal to $V_{TX-H}-\Delta V$.

FIG. 5B shows that voltage regulator 542 is coupled to receive the first supply voltage 555-H and the second supply voltage 555-L. In the example, the voltage regulator 542 is coupled to supply regulated power to a load 596. In the various examples, the voltage regulator 542 is one of a plurality of voltage regulators and load 596 is one of a plurality of loads that are included the same wafer or integrated circuit chip 536. In one example, the load 596 depicted in FIG. 5B may be a reference load that is representative of any one of the plurality of loads that are included on integrated circuit chip 536. In one example, the load 596 depicted in FIG. 5B may be a dummy load or a replica load that is representative of any one of the plurality of loads that are included on integrated circuit chip 536.

In operation, a feedback circuit 594 disposed on the integrated circuit chip 536 depicted in FIG. 5B is coupled between the load 596 and the voltage regulator 542 to provide a feedback signal to voltage regulator 542 that is responsive to load conditions of load 596, which is representative of any one of the plurality of loads that are included on integrated circuit chip 536. In the example, the feedback signal provided by feedback circuit 594 includes a high side feedback signal 598-H and a low side feedback signal 598-L. In one example, the high side feedback signal 598-H and the low side feedback signal 598-L may also optionally be coupled to be received by the power management integrated circuit (PMIC) 538. In the example, the power management integrated circuit (PMIC) 538 may be configured to provide the first supply voltage 555-H and the second supply voltage 555-L in response to the high side feedback signal 598-H and the low side feedback signal 598-L.

As shown in the depicted example, load 596 includes a modulation driver 544 that is coupled to be supplied regulated power from the voltage regulator 542. Load 596 also includes a grouping of pixel circuits 546. In the example, the grouping of pixel circuits 546 is one of a plurality of groupings of pixel circuits included in a time-of-flight pixel array, such as for example pixel array 110, disposed in the integrated circuit chip 536. For instance, in one example, the groupings of pixel circuits 546 may represent one of the rows the pixel array 110. In another example, the groupings of pixel circuits 546 may represent one of the columns of the pixel array 110. In the various examples, each of the pixel circuits included in the groupings of pixel circuits 546 may be examples of pixel circuit 312 discussed above in FIG. 3 or examples of pixel circuits 112 of pixel array 110 discussed above in FIG. 1.

In operation, the modulation driver 544 includes a driver 570 that is configured to be suppled power from a first voltage input $V_{C-H}$ and a second voltage input $V_{C-L}$ of the modulation driver 544. In the example, the first voltage input $V_{C-H}$ is a high side voltage input of driver 570 and second voltage input $V_{C-L}$ is a low side voltage input of driver 570. In the depicted example, a capacitance between the high side voltage input $V_{C-H}$ and the low side voltage input $V_{C-L}$ of driver 570 is represented in FIG. 5B with a capacitance 572 as shown. Driver 570 is configured to receive a phase modulation signal TX 514. In the various examples, the phase modulation signal TX 514 may be an example of the 0° phase modulation signal 214, or the 180° phase modulation signal 214B, or the 90° phase modulation signal 216A, or the 270° phase modulation signal 216B described in FIG. 2. As such, the driver 570 is configured to drive the transfer gates that are included in the grouping of pixel circuits 546. In one example, the grouping of pixel circuits 546 through with the phase modulation signal TX 514 is driven may be represented with a network of high side resistances 574-OH, 574-1H, . . . , 574-NM, low side resistances 574-0L, 574-1L, . . . , 574-ML, and capacitances 576-0, 576-1, . . . , 576-M as shown. As shown, the high side resistances 574-OH, 574-1H, . . . , 574-MH are coupled to the output of driver 570 and the low side resistances 574-0L, 574-1L, . . . , 574-ML are coupled to the low side voltage input $V_{C-L}$ of driver 570. In the example, it is appreciated that the voltage swings between the nodes $V_{POH}/V_{POL}$, $V_{PIH}/V_{PIL}$, . . . , $V_{PMH}/V_{PML}$ across respective capacitances 576-0, 576-1, . . . , 576-M may be representative of the voltage swings of the phase modulation signal TX 514 as they appear at the respective transfer gates or transfer transistors of the pixel circuits that are included in the grouping of pixel circuits 546 of the pixel array.

In various examples, the voltage regulator 542 includes or is implemented with one or more low dropout regulators as shown in FIG. 5B. For instance, voltage regulator 542 includes a first transistor 562H that is coupled between the first supply voltage 555-H through a resistance 560H and the first voltage input $V_{C-H}$ of driver 570 through a resistance 564H. Voltage regulator 542 also includes a first comparator 566H having a first input (e.g., "+"), a second input (e.g., "−"), and an output that is coupled to the gate of the first transistor 562H as shown. The first input of the first comparator 566H is coupled to a first reference voltage $V_{TX-H}$, and the second input of the first comparator 566H is coupled to receive the feedback signal from the feedback circuit 594. In the example depicted in FIG. 5B, the second input of the first comparator 566H is coupled to receive the high side feedback signal 598-H portion of the feedback signal from the feedback circuit 594. In one example, the first reference voltage $V_{TX-H}$ may be provided with a first bandgap reference circuit.

In the depicted example, voltage regulator 542 also optionally includes a second transistor 562L that is coupled between the second supply voltage 555-L through a resistance 560L and the second voltage input $V_{C-L}$ of driver 570 through a resistance 564L. In this example, voltage regulator 542 also includes a second comparator 566L having a first input (e.g., "+"), a second input (e.g., "−"), and an output that is coupled to the gate of the second transistor 562L as shown. The first input of the second comparator 566L is coupled to a second reference voltage $V_{TX-L}$, and the second input of the second comparator 566L is coupled to receive the feedback signal from the feedback circuit 594. In the example depicted in FIG. 5B, the second input of the first comparator 566L is coupled to receive the low side feedback signal 598-L portion of the feedback signal from the feedback circuit 594. In one example, the second reference voltage $V_{TX-L}$ may be provided with a second bandgap reference circuit. In the depicted example, a capacitance between the input side first transistor 562H and the input side of second transistor 562L is represented in FIG. 5B with a capacitance 568 as shown.

In the example depicted in FIG. 5B, the feedback circuit 594 includes an amplifier 554 coupled to a load sense circuit 548. In one example, amplifier 554 is a programmable gain amplifier. Amplifier 554 is configured to generate the feedback signal, which in the depicted example includes the high side feedback signal 598-H and the low side feedback signal 598-L.

As shown in the depicted example, the load sense circuit 548 is coupled sense the load 596 through a driver feedback input signal and a grouping of pixel circuits feedback input signal. In the example, the driver feedback input signal includes a first driver feedback input signal 550-H from the first voltage input $V_{C\text{-}H}$ of the modulation driver 544 of load 596, and a second driver feedback input signal 550-L from the second voltage input $V_{C\text{-}L}$ of the modulation driver 544 of load 596 as shown. In the example, the first voltage input $V_{C\text{-}H}$ and the second voltage input $V_{C\text{-}L}$ of the modulation driver 544 may be considered to be near end modulation outputs of load 596 that are sensed via the driver feedback signal.

In the example, the grouping of pixel circuits feedback input signal includes first pixel array feedback input signal 552-H and a second pixel array feedback input signal 552-L. In the various examples, the first pixel array feedback input signal 552-H and the second pixel array feedback input signal 552-L may be coupled to the high side and the low side of far end modulation outputs or midpoint modulation outputs the grouping of pixel circuits 546 of load 596 that are sensed via the grouping of pixel circuits feedback input signal.

In operation, the load sense circuit 548 is configured to generate a first output, which is coupled to a first input (e.g., "+") of the amplifier 554, and a second output, which is coupled a second input (e.g., "−") of the amplifier 554 in response to the load conditions of load 596 as sensed through the driver feedback input signal (e.g., via first driver feedback input signal 550-H and second driver feedback input signal 550-L) and the grouping of pixel circuits feedback input signal (e.g., via the first pixel array feedback input signal 552-H and the second pixel array feedback input signal 552-L).

In the depicted example, the load sense circuit 548 includes a differential peak detector 578, which coupled to the grouping of pixel circuits 546 of the load 596, and a weighting circuit 592, which is coupled to the modulation driver 544 and an output of the differential peak detector 578. In operation, the weighting circuit 592 is configured to generate first and second outputs, where are the first and second outputs of the load sense circuit 548, in response to the modulation driver 544, as sensed via first driver feedback input signal 550-H and second driver feedback input signal 550-L, and the output of the differential peak detector 578, which is configured to sense the grouping of pixel circuits 546 via the first pixel array feedback input signal 552-H and the second pixel array feedback input signal 552-L. In the various examples, the first and second outputs of the weighting circuit 592 are a weighted average of the first driver feedback input signal 550-H and the second driver feedback input signal 550-L from the modulation driver 592, and the output of the differential peak detector 578, which is coupled to receive the first pixel array feedback input signal 552-H and the second pixel array feedback input signal 552-L from the grouping of pixel circuits 546.

In one example, the differential peak detector 578 includes a third transistor 580 having a gate coupled to receive the first pixel array feedback input signal 552-H, which in the example depicted in FIG. 5B is coupled to a first far end modulation output $V_{PMH}$ of the grouping of pixel circuits 546. In the example, differential peak detector 578 also includes a fourth transistor 584 having a gate coupled to receive the second pixel array feedback input signal 552-L, which in the example depicted in FIG. 5B is coupled to a second far end modulation output $V_{PML}$ of the grouping of pixel circuits 546. In the example, the output of the differential peak detector 578 is coupled to a source of the third transistor 580 and a source of the fourth transistor 584 as shown. In one example, differential peak detector 578 further includes a fifth transistor 588 having a gate coupled to receive the first pixel array feedback input signal 552-H from the first far end modulation output $V_{PMH}$ of the grouping of pixel circuits 546. In the example, the output of the differential peak detector 578 is further coupled to a source of the fifth transistor 588. In the example, the output of the differential peak detector 578 is further coupled to a source of the fifth transistor 588 as shown. As shown in the example, a first current source 582 is coupled between the source of the third transistor 580 and ground. A second current source 586 is coupled between the source of the fourth transistor 584 and a reference voltage. In the example, a third current source 590 coupled to between the source of the fifth transistor 588 and the reference voltage. As shown in the example, the third transistor 580 is an NMOS transistor, and the fourth and fifth transistors 584 and 588 are PMOS transistors.

In one example, it is appreciated that a filter, such as a low pass filter, may also be coupled between the output of the differential peak detector 578 and weighting circuit 592 to filter out high frequency noise components to detect low frequency voltage changes in the grouping of pixel circuits 546 such as voltage droop across load 596 in order to regulate the output voltages provided by voltage regulator 542 in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A time-of-flight sensor, comprising:
  a voltage regulator disposed in an integrated circuit chip;
  a load disposed in the integrated circuit chip, wherein the load includes:
    a modulation driver disposed in the integrated circuit chip, wherein the modulation driver is coupled to be supplied power from the voltage regulator; and
    a grouping of pixel circuits, wherein the grouping of pixel circuits is one of a plurality of groupings of pixel circuits included in a pixel array disposed in the integrated circuit chip, wherein each one of the pixel circuits includes:
      a photodiode configured to photogenerate charge in response to reflected modulated light incident upon the photodiode;
      a first floating diffusion configured to store a first portion of charge photogenerated in the photodiode; and
      a first transfer transistor configured to transfer the first portion of charge from the photodiode to the first floating diffusion in response to a first phase modulation signal generated by the modulation driver; and
  a feedback circuit disposed in the integrated circuit chip, wherein the feedback circuit is coupled between the load and the voltage regulator, wherein the modulation driver is coupled to receive a feedback signal from the feedback circuit in response to the load, wherein the feedback signal from the feedback circuit comprises a high side feedback signal or a low side feedback signal, and wherein the voltage regulator comprises:
- a first transistor coupled between a first supply voltage and a first voltage input of the modulation driver; and
- a first comparator having a first input, a second input, and an output, wherein the output of the first comparator is coupled to a gate of the first transistor, wherein the first input of the first comparator is coupled to a first reference voltage, and wherein the second input of the first comparator is coupled to receive the feedback signal from the feedback circuit.

2. The time-of-flight sensor of claim 1, wherein the grouping of pixel circuits includes a row of pixel circuits of the pixel array.

3. The time-of-flight sensor of claim 1, wherein the grouping of pixel circuits includes a column of pixel circuits of the pixel array.

4. The time-of-flight sensor of claim 1, wherein each one of the pixel circuits further includes:
- a second floating diffusion configured to store a second portion of charge photogenerated in the photodiode; and
- a second transfer transistor configured to transfer the second portion of charge from the photodiode to the second floating diffusion in response to a second phase modulation signal generated by the modulation driver, wherein the second phase modulation signal is out of phase from the first phase modulation signal.

5. The time-of-flight sensor of claim 1, wherein voltage regulator comprises a low dropout regulator disposed in the integrated circuit chip.

6. The time-of-flight sensor of claim 1, wherein the feedback signal from the feedback circuit comprises the high side feedback signal, and wherein the second input of the first comparator is coupled to receive the high side feedback signal from the feedback circuit.

7. The time-of-flight sensor of claim 6, wherein the voltage regulator further comprises:
- a second transistor coupled between a second supply voltage and a second voltage input of the modulation driver; and
- a second comparator having a first input, a second input, and an output, wherein the output of the second comparator is coupled to a gate of the second transistor, wherein the first input of the second comparator is coupled to a second reference voltage, wherein the feedback signal from the feedback circuit further comprises the low side feedback signal, and wherein the second input of the second comparator is coupled to receive the low side feedback signal from the feedback circuit.

8. The time-of-flight sensor of claim 7, wherein the first supply voltage and the second supply voltage are configured to be provided from a power management integrated circuit.

9. The time-of-flight sensor of claim 8, wherein the power management integrated circuit is configured to provide the first supply voltage and second supply voltage in response to the feedback signal.

10. The time-of-flight sensor of claim 7, wherein the feedback circuit comprises:
- a high side coupling coupled between the first voltage input of the modulation driver and the second input of the first comparator; and
- a low side coupling coupled between the second voltage input of the modulation driver and the second input of the second comparator.

11. The time-of-flight sensor of claim 7, wherein the feedback circuit comprises:
- an amplifier having a first output configured to generate the high side feedback signal, and a second output configured to generate the low side feedback signal; and
- a load sense circuit coupled to the load, wherein the load sense circuit is configured to generate a first output coupled to a first input of the amplifier in response to the load, wherein the load sense circuit is configured to generate a second output coupled to a second input of the amplifier in response to the load.

12. The time-of-flight sensor of claim 11, wherein the amplifier of the feedback circuit comprises a programmable gain amplifier.

13. The time-of-flight sensor of claim 11, wherein the load sense circuit comprises:
- a differential peak detector coupled to the grouping of pixel circuits of the load; and
- a weighting circuit coupled to the modulation driver and an output of the differential peak detector, wherein the weighting circuit is configured to generate the first and second outputs of the load sense circuit in response to the modulation driver and the output of the differential peak detector.

14. The time-of-flight sensor of claim 13, wherein the weighting circuit is coupled to the first voltage input and the second voltage input of the modulation driver, wherein the weighting circuit is configured to generate the first and second outputs of the load sense circuit in response to the first voltage input and the second voltage input of the modulation driver and the output of the differential peak detector.

15. The time-of-flight sensor of claim 14, wherein the first and second outputs of the weighting circuit are a weighted average of the first and second voltage inputs of the modulation driver and the output of the differential peak detector.

16. The time-of-flight sensor of claim 14, wherein the differential peak detector comprises:
- a third transistor having a gate coupled to a first far end modulation output of the grouping of pixel circuits; and
- a fourth transistor having a gate coupled to a second far end modulation output of the grouping of pixel circuits, wherein the output of the differential peak detector is coupled to a source of the third transistor and a source of the fourth transistor.

17. The time-of-flight sensor of claim 16, wherein the first far end modulation output of the grouping of pixel circuits is a high side far end modulation output of the grouping of pixel circuits, wherein the second far end modulation output of the grouping of pixel circuits is a low side far end modulation output of the grouping of pixel circuits, wherein the first voltage input of the modulation driver is further a high side near end modulation output of the modulation driver, wherein the second voltage input of the modulation driver is further a low side near end modulation output of the modulation driver.

18. The time-of-flight sensor of claim 17, wherein the differential peak detector further comprises a fifth transistor having a gate coupled to the high side far end modulation output of the grouping of pixel circuits, wherein the output of the differential peak detector is further coupled to a source of the fifth transistor.

19. The time-of-flight sensor of claim 18, wherein the differential peak detector further comprises:
- a first current source coupled to the source of the third transistor;
- a second current source coupled to the source of the fourth transistor; and
- a third current source coupled to the source of the fifth transistor.

20. The time-of-flight sensor of claim 19, wherein the third transistor is an NMOS transistor, wherein the fourth and fifth transistors are PMOS transistors.

21. The time-of-flight sensor of claim 11, wherein the load is a reference one of a plurality of loads.

22. The time-of-flight sensor of claim 21, wherein the reference one of the plurality of loads is a dummy load.

23. A time-of-flight sensing system, comprising:
- a light source configured to emit modulated light to an object; and
- a time-of-flight sensor disposed in an integrated circuit chip, wherein the time-of-flight sensor is configured to sense reflected modulated light from the object, wherein the time-of-flight sensor includes:
  - a plurality of voltage regulators disposed in an integrated circuit chip;
  - a plurality of loads disposed in the integrated circuit chip, wherein each one of the plurality of loads is coupled to a respective one of the plurality of voltage regulators, wherein said each one of the plurality of loads includes:
    - a modulation driver disposed in the integrated circuit chip, wherein the modulation driver is coupled to be supplied power from the respective one of the plurality of voltage regulators; and
    - a grouping of pixel circuits, wherein the grouping of pixel circuits is one of a plurality of groupings of pixel circuits included in a pixel array disposed in the integrated circuit chip, wherein each one of the pixel circuits includes:
      - a photodiode configured to photogenerate charge in response to the reflected modulated light incident upon the photodiode;
      - a first floating diffusion configured to store a first portion of charge photogenerated in the photodiode; and
      - a first transfer transistor configured to transfer the first portion of charge from the photodiode to the first floating diffusion in response to a first phase modulation signal generated by the modulation driver; and
  - a feedback circuit disposed in the integrated circuit chip, wherein the feedback circuit is coupled between a reference one of the plurality of loads and the plurality of voltage regulators, wherein the modulation driver is coupled to receive a feedback signal from the feedback circuit in response to said reference one of the plurality of loads, wherein the feedback signal from the feedback circuit comprises a high side feedback signal or a low side feedback signal, and wherein the respective one of the plurality of voltage regulators comprises:
    - a first transistor coupled between a first supply voltage and a first voltage input of the modulation driver; and
    - a first comparator having a first input, a second input, and an output, wherein the output of the first comparator is coupled to a gate of the first transistor, wherein the first input of the first comparator is coupled to a first reference voltage, and wherein the second input of the first comparator is coupled to receive the feedback signal from the feedback circuit.

24. The time-of-flight sensing system of claim 23, wherein the grouping of pixel circuits includes a row of pixel circuits of the pixel array.

25. The time-of-flight sensing system of claim 23, wherein the grouping of pixel circuits includes a column of pixel circuits of the pixel array.

26. The time-of-flight sensing system of claim 23, wherein each one of the pixel circuits further includes:
- a second floating diffusion configured to store a second portion of charge photogenerated in the photodiode; and
- a second transfer transistor configured to transfer the second portion of charge from the photodiode to the second floating diffusion in response to a second phase modulation signal generated by the modulation driver, wherein the second phase modulation signal is out of phase from the first phase modulation signal.

27. The time-of-flight sensing system of claim 23, wherein the respective one of the plurality of voltage regulators comprises a low dropout regulator disposed in the integrated circuit chip.

28. The time-of-flight sensing system of claim 23, wherein the feedback signal from the feedback circuit comprises the high side feedback signal, and wherein the second input of the first comparator is coupled to receive the high side feedback signal from the feedback circuit.

29. The time-of-flight sensing system of claim 28, wherein the respective one of the plurality of voltage regulators further comprises:
- a second transistor coupled between a second supply voltage and a second voltage input of the modulation driver; and
- a second comparator having a first input, a second input, and an output, wherein the output of the second comparator is coupled to a gate of the second transistor, wherein the first input of the second comparator is coupled to a second reference voltage, wherein the feedback signal from the feedback circuit further comprises the low side feedback signal, and
- wherein the second input of the second comparator is coupled to receive the low side feedback signal from the feedback circuit.

30. The time-of-flight sensing system of claim 29, further comprising a power management integrated circuit configured to provide the first supply voltage and the second supply voltage.

31. The time-of-flight sensing system of claim 30, wherein the power management integrated circuit is configured to provide the first supply voltage and second supply voltage in response to the feedback signal.

32. The time-of-flight sensing system of claim 29, wherein the feedback circuit comprises:
- a high side coupling coupled between the first voltage input of the modulation driver and the second input of the first comparator; and
- a low side coupling coupled between the second voltage input of the modulation driver and the second input of the second comparator.

33. The time-of-flight sensing system of claim 29, wherein the feedback circuit comprises:
- an amplifier having a first output configured to generate the high side feedback signal, and a second output configured to generate the low side feedback signal; and a load sense circuit coupled to said reference one of the plurality of loads, wherein the load sense circuit is configured to generate a first output coupled to a first input of the amplifier in response to said reference one of the plurality of loads, wherein the load sense circuit is configured to generate a second output coupled to a second input of the amplifier in response to said reference one of the plurality of loads.

34. The time-of-flight sensing system of claim 33, wherein the amplifier of the feedback circuit comprises a programmable gain amplifier.

35. The time-of-flight sensing system of claim 33, wherein the load sense circuit comprises:
 a differential peak detector coupled to the grouping of pixel circuits of said reference one of the plurality of loads; and
 a weighting circuit coupled to the modulation driver of said reference one of the plurality of loads and an output of the differential peak detector, wherein the weighting circuit is configured to generate the first and second outputs of the load sense circuit in response to the modulation driver of said reference one of the plurality of loads and the output of the differential peak detector.

36. The time-of-flight sensing system of claim 35, wherein the weighting circuit is coupled to the first voltage input and the second voltage input of the modulation driver of said reference one of the plurality of loads, wherein the weighting circuit is configured to generate the first and second outputs of the load sense circuit in response to the first voltage input and the second voltage input of the modulation driver of said reference one of the plurality of loads and the output of the differential peak detector.

37. The time-of-flight sensing system of claim 36, wherein the first and second outputs of the weighting circuit are a weighted average of the first and second voltage inputs of the modulation driver of said reference one of the plurality of loads and the output of the differential peak detector.

38. The time-of-flight sensing system of claim 36, wherein the differential peak detector comprises:
 a third transistor having a gate coupled to a first far end modulation output of the grouping of pixel circuits of said reference one of the plurality of loads; and
 a fourth transistor having a gate coupled to a second far end modulation output of the grouping of pixel circuits of said reference one of the plurality of loads, wherein the output of the differential peak detector is coupled to a source of the third transistor and a source of the fourth transistor.

39. The time-of-flight sensing system of claim 38, wherein the first far end modulation output of the grouping of pixel circuits is a high side far end modulation output of the grouping of pixel circuits of said reference one of the plurality of loads, wherein the second far end modulation output of the grouping of pixel circuits is a low side far end modulation output of the grouping of pixel circuits of said reference one of the plurality of loads, wherein the first voltage input of the modulation driver of said reference one of the plurality of loads is further a high side near end modulation output of the modulation driver of said reference one of the plurality of loads, wherein the second voltage input of the modulation driver of said reference one of the plurality of loads is further a low side near end modulation output of the modulation driver of said reference one of the plurality of loads.

40. The time-of-flight sensing system of claim 39, wherein the differential peak detector further comprises a fifth transistor having a gate coupled to the high side far end modulation output of the grouping of pixel circuits of said reference one of the plurality of loads, wherein the output of the differential peak detector is further coupled to a source of the fifth transistor.

41. The time-of-flight sensing system of claim 40, wherein the differential peak detector further comprises:
 a first current source coupled to the source of the third transistor;
 a second current source coupled to the source of the fourth transistor; and
 a third current source coupled to the source of the fifth transistor.

42. The time-of-flight sensing system of claim 41, wherein the third transistor is an NMOS transistor, wherein the fourth and fifth transistors are PMOS transistors.

43. The time-of-flight sensing system of claim 23, wherein said reference one of the plurality of loads is a dummy load.

* * * * *